US011489799B2

(12) United States Patent
Word

(10) Patent No.: US 11,489,799 B2
(45) Date of Patent: Nov. 1, 2022

(54) SYSTEMS AND METHODS FOR COMMUNICATION ROUTING AND OPTIMIZATION AMONG MULTIPLE DISTRIBUTED LEDGERS

(71) Applicant: JPMORGAN CHASE BANK, N.A., New York, NY (US)

(72) Inventor: Gary Word, Franklin, TN (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 16/838,668

(22) Filed: Apr. 2, 2020

(65) Prior Publication Data

US 2021/0314283 A1    Oct. 7, 2021

(51) Int. Cl.
| | |
|---|---|
| *H04L 51/18* | (2022.01) |
| *H04L 9/06* | (2006.01) |
| *H04L 51/046* | (2022.01) |
| *H04L 51/42* | (2022.01) |
| *H04L 67/1087* | (2022.01) |

(52) U.S. Cl.
CPC ............ *H04L 51/18* (2013.01); *H04L 9/0637* (2013.01); *H04L 51/046* (2013.01); *H04L 51/42* (2022.05); *H04L 67/1091* (2013.01)

(58) Field of Classification Search
CPC ....... H04L 51/18; H04L 51/046; H04L 51/22; H04L 9/0637; H04L 67/1091; H04L 51/42; G06Q 10/10
See application file for complete search history.

(56) References Cited

U.S. PATENT DOCUMENTS

| | | | | |
|---|---|---|---|---|
| 2018/0113752 A1* | 4/2018 | Derbakova | .......... | G06Q 40/025 |
| 2018/0167476 A1* | 6/2018 | Hoffner | .................. | H04L 67/26 |
| 2018/0287915 A1* | 10/2018 | Smith | ..................... | H04L 51/22 |
| 2018/0375840 A1* | 12/2018 | Moy | ...................... | H04L 67/42 |

(Continued)

FOREIGN PATENT DOCUMENTS

WO    2018231255    12/2018

OTHER PUBLICATIONS

International Search Report, dated Jul. 23, 2021, from corresponding International Application No. PCT/2021/025557.

(Continued)

*Primary Examiner* — Hamza N Algibhah
*Assistant Examiner* — James Ross Hollister
(74) *Attorney, Agent, or Firm* — Greenberg Traurig LLP

(57) ABSTRACT

Systems and methods for communication routing among a plurality of distributed ledgers are disclosed. In one embodiment, in a distributed ledger routing engine comprising at least one computer processor, a method may include: (1) registering a plurality of participants, each participant associated with at least one distributed ledger; (2) storing identifying information for each of the participants, the identifying information identifying the at least one distributed ledger that the participant is associated; (3) receiving, from a messaging entity, a message for one of the participants; (4) identifying, from the identifying information, the distributed ledger with which the participant is associated; and (5) routing the message to a messaging service for the identified distributed ledger. The messaging service may write the message to its node in the identified distributed ledger.

20 Claims, 2 Drawing Sheets

(56) References Cited

U.S. PATENT DOCUMENTS

| | | | | |
|---|---|---|---|---|
| 2019/0102409 A1* | 4/2019 | Shi | .................. | H04L 67/1097 |
| 2019/0238486 A1* | 8/2019 | Zizka | .................. | H04L 51/02 |
| 2019/0354963 A1* | 11/2019 | Di Iorio | .............. | G06Q 20/223 |
| 2020/0036514 A1* | 1/2020 | Christensen | .......... | H04L 9/3265 |
| 2020/0204524 A1* | 6/2020 | Simons | .............. | G06F 16/2379 |
| 2020/0349125 A1* | 11/2020 | Earley | ................ | G06F 16/1837 |
| 2020/0349569 A1* | 11/2020 | Murao | .................. | G06Q 20/02 |
| 2020/0351192 A1* | 11/2020 | Murao | .................. | H04L 67/26 |
| 2020/0404468 A1* | 12/2020 | Klein | .................. | H04L 9/0637 |
| 2021/0058234 A1* | 2/2021 | Meyers | ................ | H04L 9/3265 |

OTHER PUBLICATIONS

Written Opinion of the International Searching Authority, dated Jul. 23, 2021, from corresponding International Application No. PCT/2021/025557.

* cited by examiner

SYSTEMS AND METHODS FOR COMMUNICATION ROUTING AND OPTIMIZATION AMONG MULTIPLE DISTRIBUTED LEDGERS

BACKGROUND OF THE INVENTION

1. Field of the Invention

The present disclosure relates generally to systems and methods for communication routing and optimization among multiple distributed ledgers.

2. Description of the Related Art

With the growth of distributed ledger technology, there are now many distributed ledgers satisfying many purposes. Participants on these distributed ledgers sometimes have to participate in multiple distributed ledgers, even where the distributed ledgers may solve similar needs. Some participants have a need for communication with other participants independent of which distributed ledger the other participant has joined.

SUMMARY OF THE INVENTION

Systems and methods for communication routing and optimization among multiple distributed ledgers are disclosed. In one embodiment, in a distributed ledger routing engine comprising at least one computer processor, a method for communication routing among a plurality of distributed ledgers may include: (1) registering a plurality of participants, each participant associated with at least one distributed ledger; (2) storing identifying information for each of the participants, the identifying information identifying the at least one distributed ledger that the participant is associated; (3) receiving, from a messaging entity, a communication for one of the participants; (4) identifying, from the identifying information, the distributed ledger with which the participant is associated; and (5) routing the communication to a messaging service for the identified distributed ledger. The messaging service may write the communication to its node in the identified distributed ledger.

In one embodiment, the identifying information may include a role of the participant, a business of the participant, a type of distributed ledger on which the participant is associated, etc. The identifying information may be received from the participant.

In one embodiment, the communication may include a topic.

In one embodiment, the distributed ledger with which the participant is associated may be further identified based on the topic in the message.

In one embodiment, the messaging service may translate the communication to a format for writing to its distributed ledger.

In one embodiment, the communication may include a message or a smart contract.

In one embodiment, the messaging entity may include a second participant associated with at least one of the plurality of distributed ledgers.

According to another embodiment, a system for communication routing among a plurality of distributed ledgers may include a plurality of distributed ledgers, each distributed ledger associated with a plurality of participants and a distributed ledger routing engine comprising at least one computer processor. The distributed ledger routing engine may register the plurality of participants, may store identifying information for each of the participants, the identifying information identifying the at least one distributed ledger that the participant is associated, may receive a communication for one of the participants from a messaging entity, may identify, from the identifying information, the distributed ledger with which the participant is associated, and may route the communication to a messaging service for the identified distributed ledger. The messaging service for the identified distributed ledger may write the communication to its node in the identified distributed ledger.

In one embodiment, the identifying information may include a role of the participant, a business of the participant, a type of distributed ledger on which the participant is associated, etc. The identifying information may be received from the participant.

In one embodiment, the communication may include a topic.

In one embodiment, the distributed ledger with which the participant is associated may be further identified based on the topic in the message.

In one embodiment, the messaging service may translate the communication to a format for writing to its distributed ledger.

In one embodiment, the communication may include a message or a smart contract.

In one embodiment, the messaging entity may include a second participant associated with at least one of the plurality of distributed ledgers.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
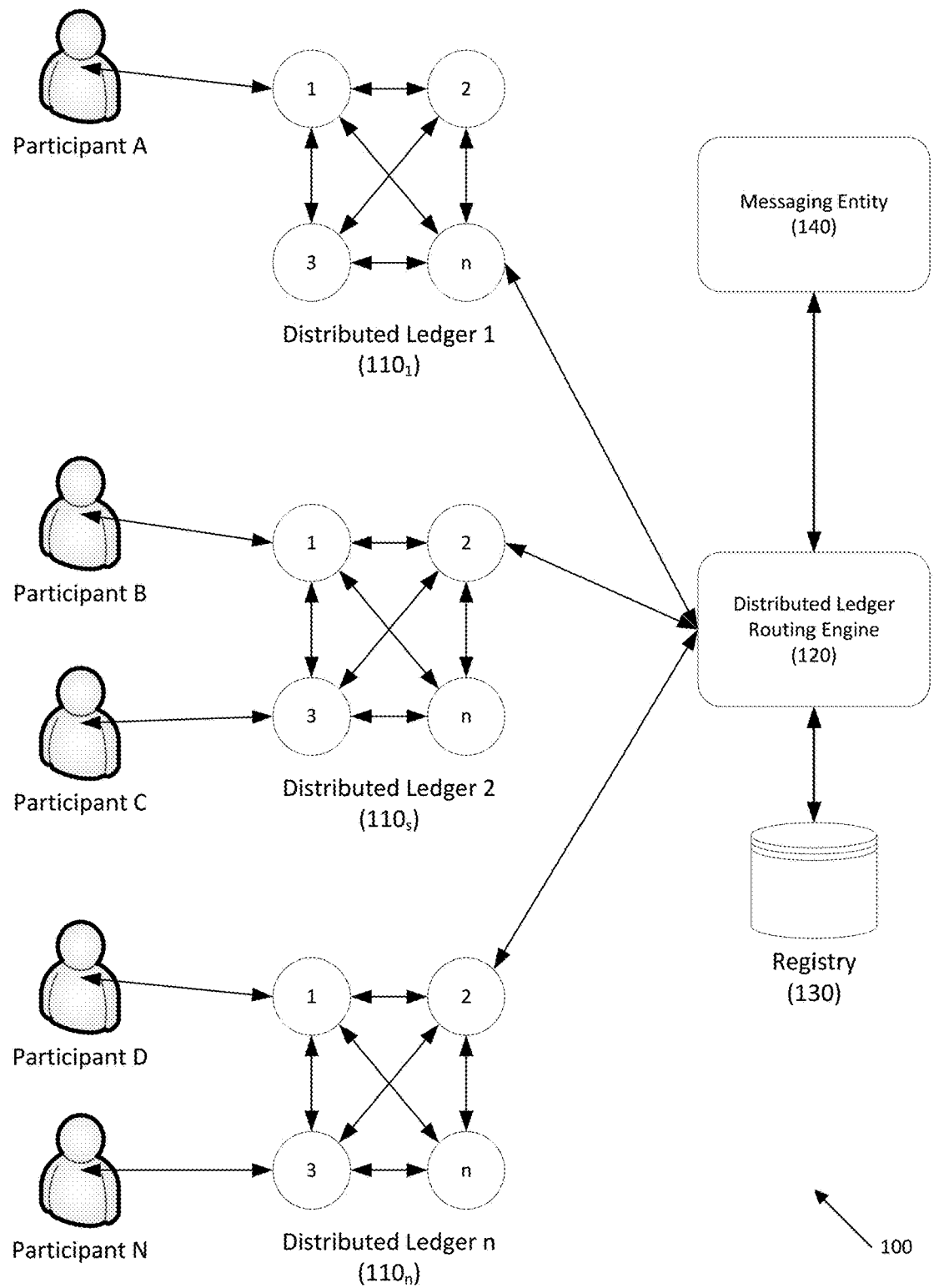
FIG. 1 depicts a system for communication routing and optimization among multiple distributed ledgers according to one embodiment.

FIG. 1 depicts a system for communication routing and optimization among multiple distributed ledgers according to one embodiment. System 100 may include a plurality of distributed ledgers, such as distributed ledger 1 $110_1$, distributed ledger 2 $110_2$, ... distributed ledger n $110_n$. Each distributed ledger 110 may be independent of the other distributed ledgers, and may operate using a different protocol from one or more of the other distributed ledgers. For example, distributed ledger 1 $110_1$ may be a Quorum-based distributed ledger. Distributed ledger 2 $110_2$, may be a HyperLedger-based distributed ledger. Distributed ledger n $110_n$ may be an Ethereum-based distributed ledger. Note that these are illustrative only and not limiting. It should be noted that a plurality of distributed ledgers 110 may operate using the same protocol.

Each distributed ledger 110 may include a plurality of nodes, e.g., nodes 1, 2, 3, . . . n. Although four nodes are depicted for each distributed ledger 110, it should be recognized that a greater or fewer number of nodes may be provided for each distributed ledger 110, and each distributed ledger 110 may have a different number of nodes as is necessary and/or desired.

Each node may have associated therewith one or more Participant, e.g., Participant A, B, C, D, . . . N. Participants may include individuals, organizations, companies, individuals acting on behalf of a company, individuals acting on their own behalf, etc.

In one embodiment, a Participant may participate in more than one distributed ledger 110 as is necessary and/or desired.

System 110 may include distributed ledger routing engine 120 which may route communications to and from messaging entity 140. In one embodiment, messaging entity 140 may be any entity that may communicate a communication, such as a message or smart contract, with one or more Participant of one or more distributed ledger 110. For example, messaging entity 140 may be a financial institution, a health care institution, a government agency, etc. Messaging entity 140 may also include any Participant that is authorized to use the registration lookup and routing capabilities. Other types of messaging entities 110 may be included as is necessary and/or desired.

In one embodiment, distributed ledger routing engine 120 may participate in each distributed ledger 110 as a node, by using an API, or as otherwise necessary and/or desired.

Distributed ledger routing engine 120 may maintain registry 130 of Participants in each distributed leger 110. In one embodiment, as each Participant joins one or more of distributed ledgers 110, Participant may be registered on with registry 130, and details, such as a Participant identifier, the type of distributed ledger in which Participant participates, whether the distributed ledger is permissioned, the purpose of the distributed ledger (e.g., financial, health care, etc.), the name of the Participant, contact information for the Participant, typical identifiers used for the Participant, and any other suitable information as is necessary and/or desired.

In one embodiment, the entries in registry 130 may be used by distributed ledger routing engine 120 to route a communication, such as a message or smart contract, from messaging entity 140 to the appropriate distributed ledger 140 for the intended Participant.

In one embodiment, distributed ledger routing engine 120 may create and manage smart contracts across distributed ledgers 110. For example, distributed ledger routing engine 120 may create and place smart contracts on an appropriate distributed ledger.

In one embodiment, for distributed ledgers 110 that support private communication channels, messaging entity 140 may use the private communication feature.

Figure 2:
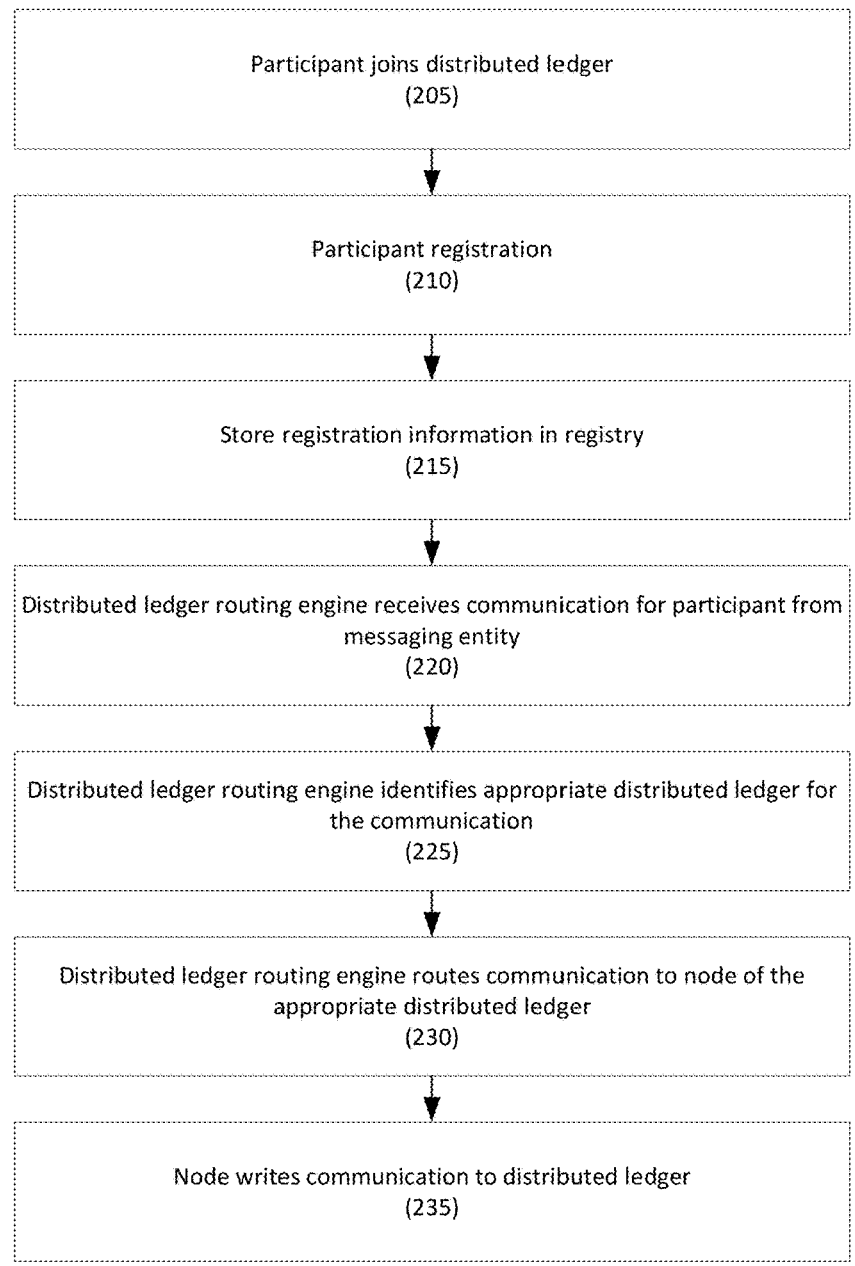
FIG. 2 depicts a method for communication routing and optimization among multiple distributed ledgers according to one embodiment.

Referring to FIG. 2, a method for communication routing and optimization among multiple distributed ledgers is disclosed according to one embodiment. In step 205, a participant may join one or more distributed ledger.

In step 210, during onboarding, the participant may be registered by, for example, a distributed ledger routing engine. In one embodiment, the distributed ledger routing engine may participate as a node in a plurality of distributed ledgers, including the distributed ledger that the participant is being onboarded.

In one embodiment, each participant may initiate and complete a registration with the distributed ledger routing engine. In another embodiment, a manager of a managed distributed ledger may register its participants with the distributed ledger routing engine. In still another embodiment the distributed ledger routing engine may register participants by identifying participants of permissioned distributed ledgers.

For example, the distributed ledger routing engine may collect identifying information for each participant. The specific information that is collected may depend on the information that is made public in a permissioned distributed ledger. Examples of data that may be collected may include participant type (company, company staff, individual), participant profile (name, address, company identifier type, company identifier, individual identifier type, individual identifier), reference to distributed ledger role types (URI or URL), distributed ledger role, specific distributed ledger role (e.g., administrator, validator, participant), the business of the distributed ledger (e.g., logistic partners, financing entities, buyers, sellers, etc.), etc. The distributed ledger may also collect information about the distributed ledger, including the type, the purpose, any associated entity, etc. Examples may include permissioned or not permissioned, public or private, etc. If the distributed ledger is permissioned, the distributed ledger routing engine may identify the administrator node(s).

Any other suitable information may be collected as is necessary and/or desired.

Registration may be manual, automated, or a combination of both (e.g., some participants are registered manually, while others are registered automatically, etc.).

In step 215, the participant's registration may be stored, for example, in a registry.

In step 220, the distributed ledger routing engine may receive a communication, such as a message or smart contract, from a messaging entity for a participant in a distributed ledger. The messaging entity may be any entity that seeks to communicate with one or more participant of one or more distributed ledgers. In one embodiment, the messaging entity may be another participant of one of the distributed ledgers.

In one embodiment, in addition to an identification of the participant, the communication may identify a topic or purpose to assist in routing the communication to the appropriate distributed ledger.

In step 225, the distributed ledger routing engine may identify the appropriate distributed ledger to route the communication to by referring to the registry. In one embodiment, if the participant participates in more than one distributed ledger, the topic or purpose of the communication may be used to identify the appropriate distributed ledger.

In step 230, the distributed ledger routing engine may route the communication to a node on the appropriate distributed ledger.

In step 235, the messaging service may write to its node in the appropriate distributed ledger. In one embodiment, at the option of the sender and depending on the capabilities of the appropriate distributed ledger, the message may be sent privately to the intended participant(s) or, if this option is selected, the message may be made public on the distributed ledger and visible to all participants, including the intended participant(s).

In one embodiment, the messaging service may further translate the smart contract into a format and language appropriate for the technology of the target distributed ledger.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, or UDP, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, Python, REXX, Visual Basic, JavaScript, for example. Other programming languages may include SolidityDigital Assist Modeling Language (DAML), Yuper, eWASM, Idris, Flnt, Formality, Huff, Lira, Ivy, Simplicity, BitML, etc.

Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for communication routing among a plurality of distributed ledgers, comprising:
   in a distributed ledger routing engine comprising at least one computer processor:
      registering a plurality of participants, each participant associated with at least one distributed ledger of a plurality of distributed ledgers, at least two of the participants associated with different distributed ledgers;
      storing identifying information for each of the participants, the identifying information identifying the at least one distributed ledger that the participant is associated;
      receiving, from a messaging entity, a communication for one of the participants;
      identifying, from the identifying information, the distributed ledger with which the participant is associated; and
      routing the communication to a messaging service for the identified distributed ledger;
      wherein the messaging service writes the communication to its node in the identified distributed ledger.

2. The method of claim 1, wherein the registration information comprises a role of the participant.

3. The method of claim 1, wherein the registration information comprises a business of the participant.

4. The method of claim 1, wherein the registration information comprises a type of distributed ledger on which the participant is associated.

5. The method of claim 1, wherein the registration information is received from the participant.

6. The method of claim 1, wherein the communication comprises a topic.

7. The method of claim 6, wherein the distributed ledger with which the participant is associated is further identified based on the topic in the message.

8. The method of claim 1, wherein the messaging service translates the communication to a format for writing to its distributed ledger.

9. The method of claim 1, wherein the communication comprises a message or a smart contract.

10. The method of claim 1, wherein the messaging entity comprises a second participant associated with at least one of the plurality of distributed ledgers.

11. A system for communication routing among a plurality of distributed ledgers, comprising:
- a plurality of distributed ledgers, each distributed ledger associated with a plurality of participants; and
- a distributed ledger routing engine executed by at least one computer processor that is coupled to a memory;

wherein:
- the distributed ledger routing engine registers the plurality of participants;
- the distributed ledger routing engine stores registration information for each of the participants in a registry, the registration information identifying the at least one distributed ledger of the plurality of distributed ledgers that the participant is associated, at least two of the participants associated with different distributed ledgers;
- the distributed ledger routing engine receives a communication for one of the participants from a messaging entity;
- the distributed ledger routing engine identifies from the registration information, the distributed ledger with which the participant is associated;
- the distributed ledger routing engine routes the communication to a messaging service for the identified distributed ledger; and
- the messaging service for the identified distributed ledger writes the communication to its node in the identified distributed ledger.

12. The system of claim 11, wherein the registration information comprises a role of the participant.

13. The system of claim 11, wherein the registration information comprises a business of the participant.

14. The system of claim 11, wherein the registration information comprises a type of distributed ledger on which the participant is associated.

15. The system of claim 11, wherein the registration information is received from the participant.

16. The system of claim 11, wherein the communication comprises a topic.

17. The system of claim 16, wherein the distributed ledger with which the participant is associated is further identified based on the topic in the message.

18. The system of claim 11, wherein the messaging service translates the communication to a format for writing to its distributed ledger.

19. The system of claim 11, wherein the communication comprises a message or a smart contract.

20. The system of claim 11, wherein the messaging entity comprises a second participant associated with at least one of the plurality of distributed ledgers.

* * * * *